O. B. BROWN & H. G. CAREY.
Music Blackboards.
No. 145,622.  Patented Dec. 16, 1873.
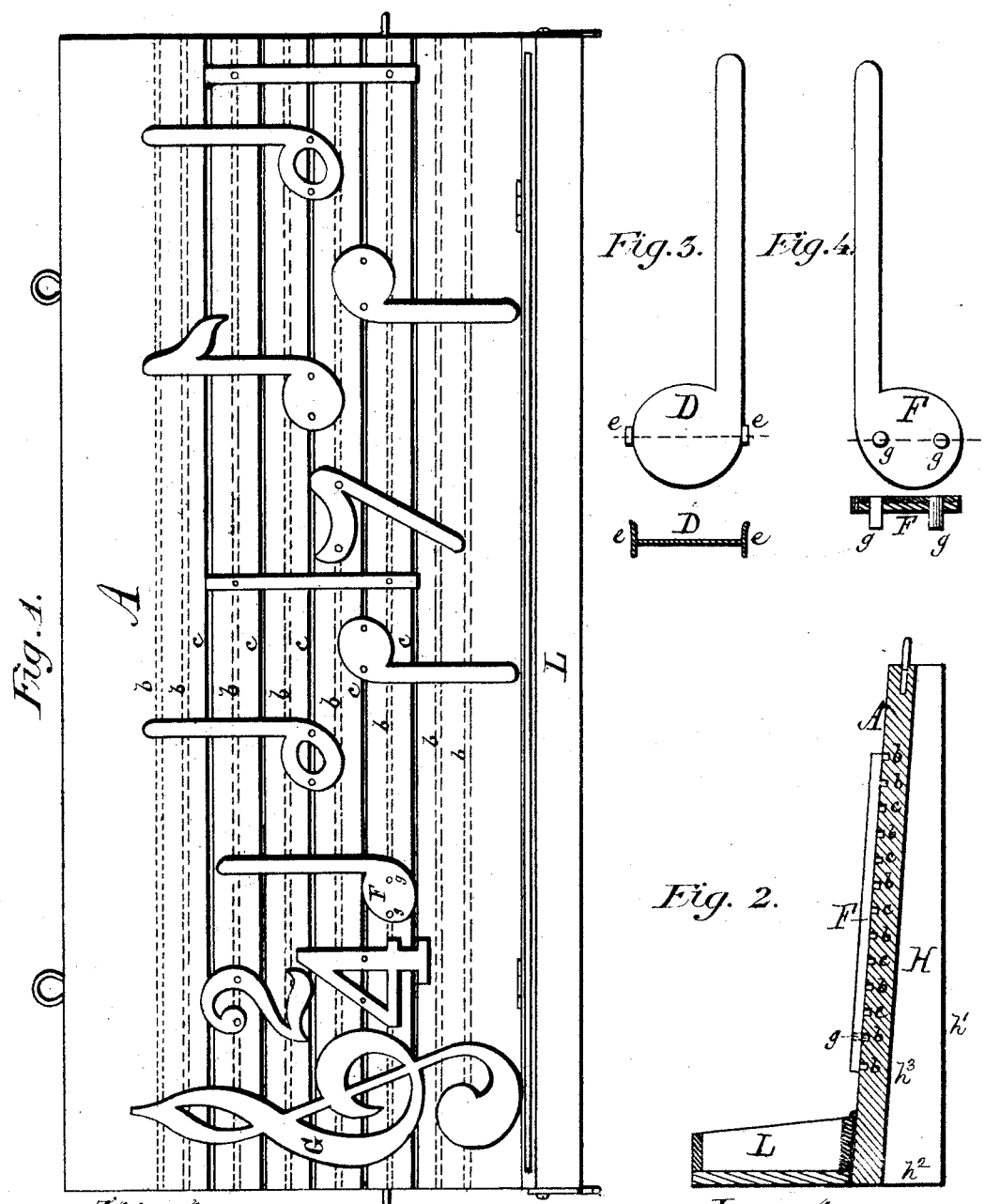

UNITED STATES PATENT OFFICE.

OBADIAH B. BROWN AND HENRY G. CAREY, OF MALDEN, MASSACHUSETTS.

IMPROVEMENT IN MUSIC-BLACKBOARDS.

Specification forming part of Letters Patent No. 145,622, dated December 16, 1873; application filed June 5, 1873.

*To all whom it may concern:*

Be it known that we, OBADIAH B. BROWN and HENRY G. CAREY, of Malden, in the county of Middlesex and State of Massachusetts, have invented a new and useful Improved Music-Board; and that the following is a full, clear, and exact description thereof, sufficient to enable those skilled in the art to which our invention appertains to make and use the same, reference being had to the accompanying drawing making part of this specification, and to the letters and figures marked thereon.

Our invention relates to a portable board to be used instead of the ordinary blackboard in school, class, and lecture-rooms, and is designed more particularly for the purpose of teaching music, though it may be readily adapted to the teaching of other sciences by changing the form of the characters used in connection with the board itself. Our invention consists in, first, a board provided with horizontal grooves for holding in place musical characters, a portion of the grooves being of the same color as the board, so as to be invisible at a short distance, and others being of the opposite color to represent the staff; second, musical characters formed of wood, made of two or more thicknesses, with the grain crossed to prevent warping, and provided with pins or projections for engagement with the grooves in the board; third, a box hinged to the board to serve as a receptacle for the characters, and to be turned up against it when packed for removal, or to prevent the loss of the characters; fourth, tapering cleats on the rear side of the board for imparting a backward inclination to the board when suspended against the wall, whereby the characters are not liable to fall out of place; fifth, a clef made of thin wood, and secured to the board by gluing.

The board itself may be painted black, and the characters, with the grooves representing the staff-lines, may be white; or the board itself may be painted white, and the characters and staff-line grooves black, as may be preferred.

In the accompanying drawing, Figure 1 is a front view, representing the music-board suspended against the wall. Fig. 2 is a transverse section thereof. Fig. 3 represents one of the characters when made of metal, and Fig. 4 when made of wood.

The board A has two series of grooves, $b\ c$, running its entire length, corresponding in width and depth with pins or lugs projecting from the musical characters, for the purpose of holding said characters in place. The grooves $b$, shown in dotted lines in Fig. 1, are painted the same color as the board, so as to be invisible at a short distance; and the grooves $c$, shown in full lines, are of the opposite color, to represent the lines of the staff. Leger-lines may be formed with the characters, or they may be formed of separate pieces, as may be preferred. The musical characters, such as notes, rests, figures, &c., may be made of metal or of wood. When made of metal, as shown in Fig. 3, the note D is formed with lugs $e$ extending from two opposite sides, and turned down so as to engage with the grooves in the board. The metal may be tin or any other suitable white metal, and may be left white, to be used on a black board, or may be colored, so as to be used on a white board. When made of wood, as shown in Fig. 4, the note F is formed of two or more thicknesses, with the grain crossed to prevent warping, and has pins or studs $g$ projecting from the rear side for engagement with the grooves in the board.

If desired, the lugs $e$ may be attached to the metal characters by soldering instead of being of the same piece. Instead of the pins $g$ on the wooden characters, a continuous tongue may be formed on the rear side. In some cases a tongue may be preferable, as, for instance, where a leger-line is formed in the same piece with the character.

The grooves $b\ c$ have their sides parallel with each other, and perpendicular to the face of the board. The lugs $e$ and pins $g$ are made to correspond as closely as possible with the dimensions of the grooves, so as to fit nicely therein. But should any inaccuracy exist, or should the lugs or pins fit loosely by reason of wear or shrinkage of the material, the characters are prevented from falling out of place in consequence of the backward inclination of the board A, which inclination is effected by the tapering cleats on the rear side of the board. The cleat H has its rear side $h^1$ perpendicular to its lower side $h^2$, forming a right angle therewith, and its front side $h^3$, inclined backward and upward, forming an acute angle with the lower side $h^2$. The front side $h^3$ is attached to the rear side of the board A, as shown clearly in Fig. 2, from which it will readily be seen that when the board is suspended against a vertical wall, or rests upon a horizontal surface, the front of the board is inclined backward sufficiently to prevent the characters from falling out of place.

The clef may be made of sheet metal, and permanently attached to the board by pins or rivets; or it may be made of thin wood, and attached to the board by gluing. The clef G, shown in Fig. 1, is made of wood, and is glued to the board. Of course, when desired, the clefs can be made detachable, like the other characters.

Near the lower edge of the board, and hinged to the face thereof, is a box or case, L, which serves as a receptacle for the characters. It may be partitioned off into different compartments for the different characters, so as to render them easily accessible when required for use. Being hinged to the board, the box or case is readily turned up against the face, so as to be out of the way when not in use; and, being provided with fastenings, it prevents the loss or misplacement of the characters when packed for removal. The box L, shown in the drawing, has its lower side in line with the lower edge of the board, and assists in supporting it when resting upon a horizontal surface.

The board may be provided with legs for supporting it, instead of having it suspended from nails, said legs being so arranged as to fold out of the way when not in use, or when packed for transportation.

Having thus described our invention, what we claim as new, and desire to secure by Letters Patent, is—

1. The board A, provided with horizontal grooves $b$ $c$ for holding in place musical characters, the grooves $b$ being of the same color as the board, and the grooves $c$ of a different color to represent the staff, substantially as shown and described.

2. Musical characters formed of wood in two or more thicknesses, with the grain crossed to prevent warping, and provided with pins or projections for engagement with the grooves in the board, substantially as shown and described.

3. The box L, serving as a receptacle for the characters, and hinged to the lower portion of the board A, so as to be turned up and fastened when not in use, substantially as shown and described.

4. A music-blackboard provided with tapering cleats H for effecting the backward inclination of the board, substantially as shown and described.

5. A clef made of thin wood and secured to the board by gluing, substantially as shown and described.

The above specification of our invention signed by us this 30th day of May, 1873.

O. B. BROWN.
H. G. CAREY.

Witnesses:
HENRY H. HYDE,
A. F. SARGENT.